US010477651B2

(12) United States Patent
Ludwig, Jr. et al.

(10) Patent No.: US 10,477,651 B2
(45) Date of Patent: Nov. 12, 2019

(54) CONTROL DEVICE HAVING AN ILLUMINATED PORTION CONTROLLED IN RESPONSE TO AN EXTERNAL SENSOR

(71) Applicant: Lutron Technology Company LLC, Coopersburg, PA (US)

(72) Inventors: Stephen M. Ludwig, Jr., Whitehall, PA (US); James P. Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 15/067,899

(22) Filed: Mar. 11, 2016

(65) Prior Publication Data

US 2016/0270191 A1 Sep. 15, 2016

Related U.S. Application Data

(60) Provisional application No. 62/132,592, filed on Mar. 13, 2015, provisional application No. 62/166,235, filed on May 26, 2015, provisional application No. 62/240,315, filed on Oct. 12, 2015.

(51) Int. Cl.
H05B 37/02 (2006.01)

(52) U.S. Cl.
CPC ..... *H05B 37/0254* (2013.01); *H05B 37/0218* (2013.01); *H05B 37/0227* (2013.01); *H05B 37/0272* (2013.01); *Y02B 20/46* (2013.01)

(58) Field of Classification Search
CPC ............ H05B 37/0218; H05B 37/0254; H05B 37/0272; Y02B 20/46
See application file for complete search history.

(56) References Cited

U.S. PATENT DOCUMENTS

| 5,248,919 | A | 9/1993 | Hanna et al. |
| 7,036,948 | B1* | 5/2006 | Wyatt ............... H01R 13/6683 362/276 |
| 7,361,853 | B2 | 4/2008 | Clegg et al. |
| 7,414,210 | B2 | 8/2008 | Clegg et al. |
| 7,432,460 | B2 | 10/2008 | Clegg et al. |
| 7,432,463 | B2 | 10/2008 | Clegg et al. |
| 7,786,623 | B2 | 8/2010 | Farmer et al. |

(Continued)

FOREIGN PATENT DOCUMENTS

WO   WO 1999/060538 A1   11/1999

*Primary Examiner* — Douglas W Owens
*Assistant Examiner* — Pedro C Fernandez
(74) *Attorney, Agent, or Firm* — Condo Roccia Koptiw LLP

(57) ABSTRACT

A load control system for controlling at least one electrical load may comprise a plurality of control devices and a sensor external to at least one of the control devices. The sensor may be configured to sense a condition of a space in which the control devices are installed. The at least one electrical load may be controlled in response to the condition sensed by the sensor. The control devices may include respective illuminated portions. The control devices may adjust the intensity of the respective illuminated portions in response to the condition sensed by the sensor. If multiple sensors are included in the load control system to sense the condition, the control devices may adjust the intensity of their respective illuminated portions by aggregating the condition sensed by each sensor.

36 Claims, 6 Drawing Sheets

(56) References Cited

U.S. PATENT DOCUMENTS

| | | |
|---|---|---|
| 7,791,595 B2 | 9/2010 | Altonen et al. |
| 7,796,057 B2 | 9/2010 | Swatsky et al. |
| 7,825,891 B2 | 11/2010 | Yao et al. |
| 8,009,042 B2 | 8/2011 | Steiner et al. |
| 8,031,164 B2 | 10/2011 | Herz et al. |
| 8,077,058 B2 | 12/2011 | Swatsky et al. |
| 8,102,375 B1 | 1/2012 | Feldstein |
| 8,194,031 B2 | 6/2012 | Yao et al. |
| 8,199,010 B2 | 6/2012 | Sloan et al. |
| 8,228,184 B2 | 7/2012 | Blakeley et al. |
| 8,330,638 B2 | 12/2012 | Altonen et al. |
| 8,410,706 B2 | 4/2013 | Steiner et al. |
| 8,451,116 B2 | 5/2013 | Steiner et al. |
| 8,698,727 B2 | 4/2014 | Herz et al. |
| 8,698,792 B2 | 4/2014 | Chang et al. |
| 9,763,302 B2 | 9/2017 | McDonald et al. |
| 10,027,127 B2 | 7/2018 | Crafts et al. |
| 2002/0175641 A1 | 11/2002 | Andersen |
| 2008/0111491 A1 | 5/2008 | Spira |
| 2009/0206769 A1* | 8/2009 | Biery .............. H05B 39/041 315/291 |
| 2012/0050189 A1* | 3/2012 | Choboter .......... H04M 1/72577 345/173 |
| 2012/0095601 A1* | 4/2012 | Abraham ................. E06B 9/68 700/278 |
| 2012/0261078 A1 | 10/2012 | Adams et al. |
| 2012/0286940 A1 | 11/2012 | Carmen, Jr. et al. |
| 2012/0313535 A1* | 12/2012 | Bedell ............... H05B 37/0227 315/158 |
| 2013/0030589 A1 | 1/2013 | Pessina et al. |
| 2013/0080762 A1* | 3/2013 | Cretella, Jr. .......... G06F 1/1626 713/100 |
| 2013/0181630 A1* | 7/2013 | Taipale .............. H05B 37/0263 315/224 |
| 2013/0214609 A1 | 8/2013 | Carmen, Jr. |
| 2013/0313535 A1 | 11/2013 | Heo et al. |
| 2014/0001846 A1* | 1/2014 | Mosebrook ......... H04L 12/2816 307/11 |
| 2014/0132158 A1* | 5/2014 | Land ...................... G09G 3/20 315/152 |
| 2014/0132475 A1 | 5/2014 | Bhutani et al. |
| 2014/0159921 A1* | 6/2014 | Qualey ................ A61B 5/7445 340/870.09 |
| 2014/0265880 A1 | 9/2014 | Taipale et al. |
| 2014/0305602 A1 | 10/2014 | Kirby et al. |
| 2017/0043712 A1* | 2/2017 | Paszkowicz .......... B60K 37/00 |

* cited by examiner

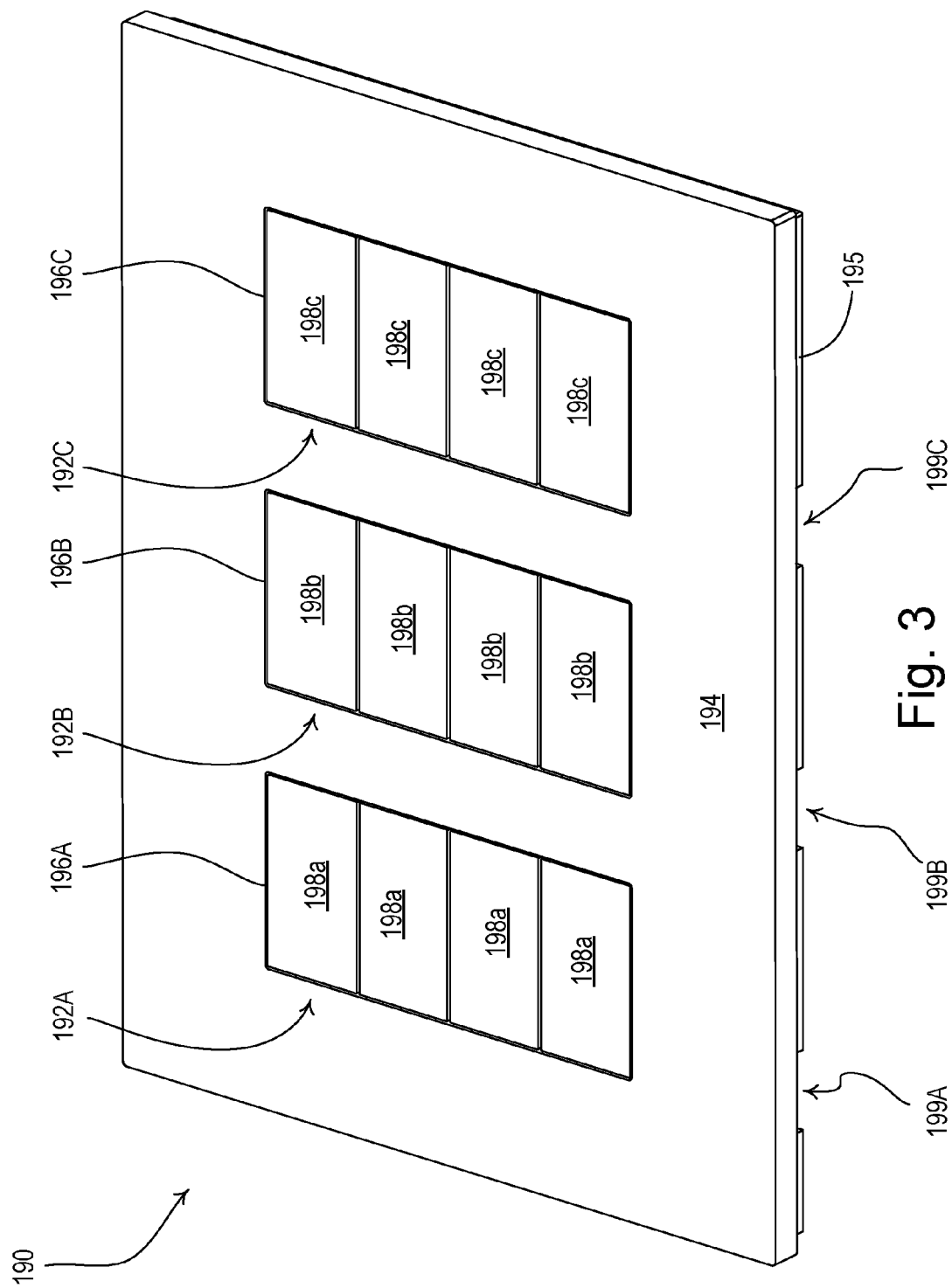

CONTROL DEVICE HAVING AN ILLUMINATED PORTION CONTROLLED IN RESPONSE TO AN EXTERNAL SENSOR

CROSS REFERENCE TO RELATED APPLICATION

This application claims the benefit of Provisional U.S. Patent Application No. 62/132,592, filed Mar. 13, 2015, Provisional U.S. Patent Application No. 62/166,235, filed May 26, 2015, and Provisional U.S. Patent Application No. 62/240,315, filed Oct. 12, 2015, the disclosures of which are incorporated herein by reference in their entireties.

BACKGROUND

Home automation systems, which have become increasingly popular, may be used by homeowners to integrate and control electrical and/or electronic devices in their homes. For example, a homeowner may connect appliances, lights, blinds, thermostats, cable or satellite boxes, security systems, telecommunication systems, and the like to each other via a wired or wireless home network. The homeowner may control these devices using a controller or user interface. The controller or user interface may be provided via one or more control devices, e.g., a tabletop or wall-mounted keypad, a wall-mounted touch screen, a phone, a tablet, a computer, and the like. The control devices may be directly connected to the home network or remotely connected, e.g., via the Internet. The control devices may communicate with each other and/or with the controller to, for example, improve the control devices' efficiency, convenience, and/or usability.

Some of the control devices may each comprise a visual display, such as a light-emitting diode (LED) display, for communicating information to a user and/or receiving user inputs. The visual display may be illuminated (e.g., via a backlight) in a dark space. The visual display (and/or the backlight) may be turned off when the control device is not being used, for example, to save energy. For instance, the control device may comprise a proximity sensor mounted on the control device adjacent to the visual display for detecting when a user is near the control device. The visual display of the control device may be automatically turned on and illuminated when a user's presence is detected. The control device may comprise an ambient light sensor mounted on the control device adjacent to the visual display for adjusting the backlight intensity of the visual display in order to provide optimum viewing of the visual display in the present ambient light. However, the addition of a proximity sensor and/or an ambient light sensor to each control device having a visual display may increase the cost of the control devices. The control devices may also need to be physically bigger in order to accommodate the sensor(s).

In another situation, multiple control devices may be installed next to each other, e.g., in a multi-gang electrical wallbox. Two or more of the control devices may each include an illuminated portion (e.g., the visual display described herein), and an ambient light sensor mounted adjacent to the illuminated area for measuring a light level around the control device and adjusting the intensity/brightness of the illuminated portion. The measurements taken by the ambient light sensors, however, may not always be the same, for example, due to each sensor's installation position and/or the direction of ambient light sources. Such inconsistent measurements of the light level may cause the illuminated portions of adjacent control devices to appear differently. Usability and/or aesthetic appeal of the control devices may be affected as a result.

SUMMARY

As described herein, a system for controlling at least one electrical load may comprise a plurality of control devices. The control devices may each include an illuminated portion. The light intensity of the illuminated portion may be controlled in response to a sensor configured to sense a condition of a space in which the control devices are installed. For example, the condition may be an occupancy or vacancy condition in the space and/or a light level in the space. The sensor may be external to at least one of the control devices (e.g., a stand-alone sensor external to all of the control devices or an integral sensor included in a control device). The sensor or the control device comprising the sensor may be configured to transmit a signal that is indicative of the sensed condition. The control devices may be configured to adjust their respective illuminated portions in response to the sensed condition. If multiple sensors are included in the system and configured to sense the condition, the control devices may be configured to control their respective illuminated portions by aggregating the condition sensed by each sensor.

Also described herein is a control device for controlling an electrical load. The control device may be part of a load control system and may comprise a user interface (e.g., for receiving a user input and/or displaying feedback to the user) and an illuminated portion. The illuminated portion may be controlled in response to a sensor of the load control system. The sensor may be external to the control device and be configured to sense a condition of a space in which the control device is installed. The sensor may transmit a control signal indicative of the sensed condition. The control device may comprise a communication circuit configured to transmit and receive control signals and a control circuit electrically coupled to the user interface, the illuminated portion, and the communication circuit. The control circuit may be configured to receive a control signal indicative of the condition sensed by the sensor and to control the illuminated portion in response to the control signal. The control circuit may be further configured to control the electrical load in response to the user interface receiving a user input.

A load control system comprising an input device, a sensor, and a load control device, and configured to control an electrical load is also described. The sensor may be external to both the input device and the load control device, and be configured to sense a condition of a space in which the electrical load is installed. The input device may include a user interface (e.g., configured to receive a user input and/or to display feedback to the user) and an illuminated portion. The input device may be configured to transmit a first control signal in response to receiving a user input for controlling the electrical load. The sensor may be configured to transmit a second control signal for controlling the electrical load in response to sensing the condition. The load control device may be configured to control the electrical load in response to the first and second control signals. The input device may be further configured to control the illuminated portion in response to the condition sensed by the sensor.

BRIEF DESCRIPTION OF THE DRAWINGS

FIG. 3 shows an example multi-gang configuration including three control devices.

DETAILED DESCRIPTION

Figure 1:
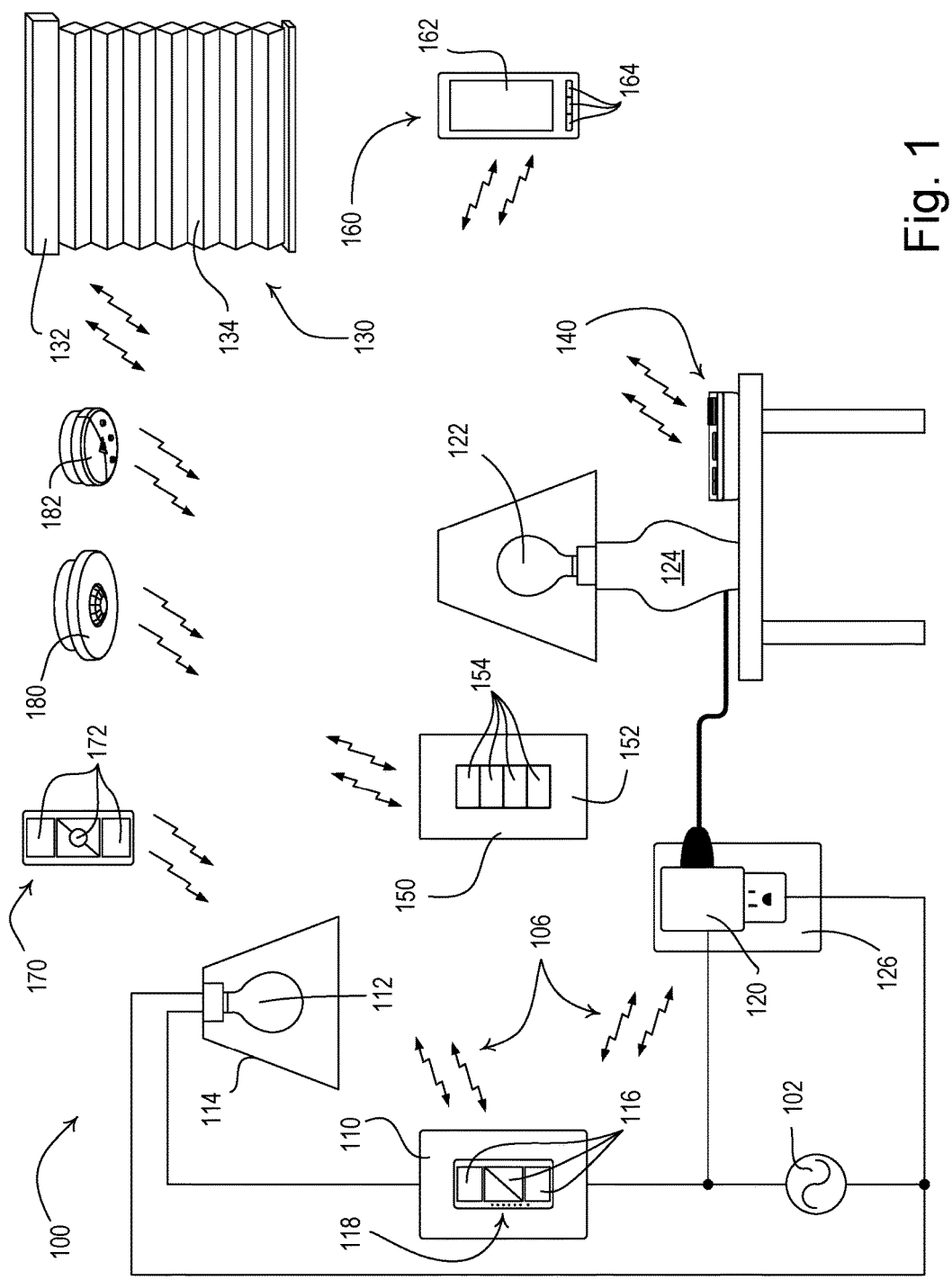
FIG. 1 shows a diagram of an example load control system for controlling one or more electrical loads.

FIG. 1 shows an example load control system 100 (e.g., a lighting control system) for controlling the amount of power delivered to one or more electrical loads (e.g., lighting loads). The source of the power may be an alternating-current (AC) power source such as the AC power source 102. The load control system 100 may comprise a first load control device (e.g., a wall-mounted dimmer switch 110) coupled between the AC power source 102 and a first lighting load (e.g., a first light bulb 112). The coupling may be via a series electrical connection, for example. The first lighting load may be installed in a ceiling mounted downlight fixture 114, in a wall-mounted lighting fixture, or in other lighting fixtures standing or mounted to another surface. The dimmer switch 110 may be adapted to be wall-mounted in a standard electrical wallbox. The dimmer switch 110 may comprise a load control circuit (e.g., an internal, controllably conductive device, such as a relay or a triac) coupled (e.g., via a series electrical connection) between the AC power source 102 and the lighting load (e.g., the first light bulb 112). The load control circuit may control at least the amount of power delivered to the lighting load and thus the intensity of the lighting load.

The dimmer switch 110 may comprise a user interface configured to receive a user input and/or display feedback to the user. For example, the user interface may include one or more actuators 116 (e.g., buttons, a thin touch-sensitive actuator, and/or the like) for controlling the light bulb 112. In response to actuation of the actuators 116, the dimmer switch 110 may be configured to turn the light bulb 112 on and off, and/or to increase or decrease the amount of power delivered to the light bulb and thus increase or decrease the intensity of the light bulb from a minimum intensity (e.g., approximately 1%) to a maximum intensity (e.g., approximately 100%). The dimmer switch 110 may further comprise an illuminated portion. The illuminated portion may overlap with the user interface (e.g., being part of the user interface) or be separated from the user interface. In an example, the illuminated portion may be part of the user interface and may include a plurality of visual indicators 118. The visual indicators 118 may be arranged in a linear array and be illuminated to provide feedback of the intensity of the light bulb 112. The visual indicators 118 may be illuminated by one or more discrete light sources, such as one or more light-emitting diodes (LEDs) located behind the visual indicators. In another example, the user interface of the dimmer switch 110 may comprise a thin touch sensitive actuator as shown and described in commonly-assigned U.S. Pat. No. 7,791,595, issued Sep. 7, 2010, entitled TOUCH SCREEN ASSEMBLY FOR A LIGHTING CONTROL, the entire disclosure of which is hereby incorporated by reference. The thin touch sensitive actuator may have a substantially transparent actuation member that may be illuminated by one or more light sources (e.g., LEDs). The light sources may be positioned behind the actuation member. When illuminated, the thin touch sensitive actuation member may define an illuminated portion of the dimmer switch.

The dimmer switch 110 may be configured to receive digital messages via wired (e.g., through a wired digital communication link) or wireless signals (e.g., radio-frequency (RF) signals 106), and to control the light bulb 112 in response to the received digital messages. Examples of wall-mounted dimmer switches are described in greater detail in U.S. Pat. No. 5,248,919, issued Sep. 29, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The load control system 100 may comprise a second load control device, which may be of any particular type. For example, the second load control device may be a plug-in load control device 120 coupled (e.g., via a series electrical connection) between the AC power source 102 and a second lighting load (e.g., a second light bulb 122 installed in a table lamp 124). The plug-in load control device 120 may be plugged into an electrical receptacle 126 powered by the AC power source 102, and the lamp (e.g., the table lamp 124) may be plugged into the plug-in load control device 120. Other examples of the second load control device may include, for example, a tabletop load control device or a remotely-mounted load control device. Either or both of the first load control device (e.g., the wall-mounted load control device 110) and the second load control device (e.g., the plug-in load control device 120) may be implemented as electronic switches configured to turn on and off the respective electrical loads (e.g., light bulbs 112 and 122).

The load control system 100 may comprise a daylight control device, e.g., a motorized window treatment 130, mounted in front of a window for controlling the amount of daylight entering the space in which the load control system 100 is installed. The motorized window treatment 130 may comprise, for example, a cellular shade, a roller shade, a drapery, a Roman shade, a Venetian blind, a Persian blind, a pleated blind, a tensioned roller shade systems, or other suitable motorized window covering. The motorized window treatment 130 may comprise a motor drive unit 132 for adjusting the position of a covering material 134 of the motorized window treatment (e.g., a cellular shade fabric as shown in FIG. 1) in order to control the amount of daylight entering the space. The motor drive unit 132 of the motorized window treatment 130 may be configured to receive digital messages via wired or wireless signals (e.g., the RF signals 106) and to control the amount of daylight entering the space in response to the received digital messages. The motorized window treatment 130 may have an antenna mounted on or extending from the motor drive unit 132 for receiving the RF signals 106. The motor drive unit 132 of the motorized window treatment 130 may be battery-powered or may receive power from an external direct-current (DC) power supply. Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more input devices (e.g., RF transmitters) configured to receive user inputs, transmit digital messages, and/or receive digital messages. The digital messages may be transmitted via wired (e.g., through a wired communication link) or wireless signals (e.g., the RF signals 106). For example, the input device may be a tabletop remote control device 140, a wall-mounted remote control device 150, a visual display remote control device 160 (e.g., a dynamic keypad), and/or a battery-powered handheld remote control device 170. The digital messages transmitted by the input device may include information such as a command, a query, and/or identifying information. For example, the digital messages transmitted by the input device may include a serial number (e.g., a unique identifier) associated with the transmitting input device. The wireless signals (e.g., the RF signals 106) carrying the digital messages may be transmitted at a certain communication frequency or frequency range $f_{RF}$ (e.g., approximately 434 MHz, 2.4 GHz, or 5.6 GHz). The transmission may utilize a proprietary communication protocol, such as the ClearConnect® protocol, WIFI, Bluetooth®, ZIGBEE, Z-WAVE, KNX-RF, ENOCEAN RADIO, or a different proprietary protocol.

The input devices may be assigned to the load control devices (e.g., the wall-mounted dimmer switch 110, the plug-in load control device 120, and/or the motorized window treatment 130) during a configuration procedure of the load control system 100, such that the load control devices may be responsive to digital messages transmitted by the input devices (e.g., via the RF signals 106). Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM; U.S. Patent Application Publication No. 2013/0214609, published Aug. 22, 2013, entitled TWO-PART LOAD CONTROL SYSTEM MOUNTABLE TO A SINGLE ELECTRICAL WALLBOX; and U.S. patent application Ser. No. 13/830,237, filed Mar. 14, 2013, entitled COMMISSIONING LOAD CONTROL SYSTEMS; the entire disclosures of which are hereby incorporated by reference.

The load control system 100 may further comprise a gateway device, e.g., a bridge (not shown), configured to enable communication with a network, such as a wireless or wired local area network (LAN). The gateway device may be connected to a router (not shown) via a wired digital communication link (e.g., an Ethernet communication link). The router may allow for communication with the network, e.g., for access to the Internet. The gateway device may be wirelessly connected to the network, e.g., using Wi-Fi technology. The gateway device may be configured to transmit the RF signals 106 to the load control devices (e.g., wall-mounted dimmer switch 110, the plug-in load control device 120, and/or the motorized window treatment 130) for controlling the respective electrical loads (e.g., the light bulbs 112, 122, and/or the covering material 132) in response to digital messages received from external devices via the network. The transmission may use a proprietary protocol described herein. The gateway device may be configured to receive digital messages from the control devices of the load control system 100 (e.g., via the RF signals 106 and using a proprietary protocol). The gateway device may be configured to transmit digital messages via the network for providing data (e.g., status information) to external devices. The gateway device may operate as a central controller for the load control system 100, or may relay digital messages between the control devices of the load control system and the network.

The load control system 100 may further comprise a network device (not shown), such as, a smart phone (e.g., an iPhone® smart phone, an Android® smart phone, or a Blackberry® smart phone), a personal computer, a laptop, a wireless-capable media device (e.g., MP3 player, gaming device, or television), a tablet device (e.g., an iPad® handheld computing device), a Wi-Fi or wireless-communication-capable television, or any other suitable Internet-Protocol-enabled device. For example, the network device may be configured to transmit RF signals to the gateway device via a Wi-Fi communication link, a Wi-MAX communications link, a Bluetooth® communications link, a near field communication (NFC) link, a cellular communications link, a television white space (TVWS) communication link, or any combination thereof. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

Figure 2A:
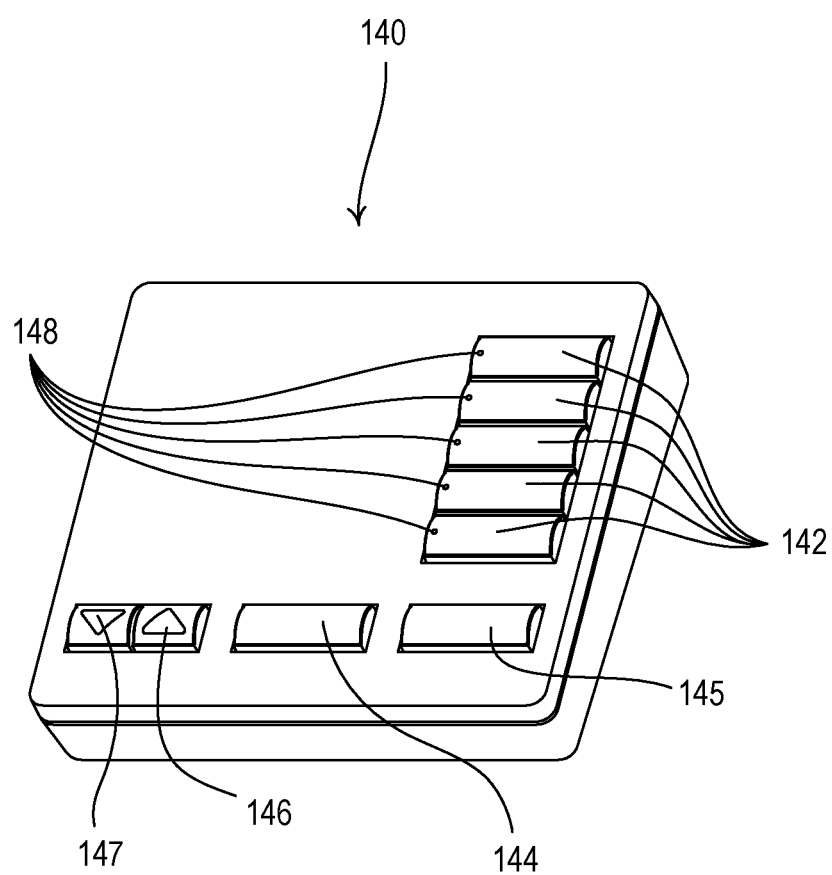
FIG. 2A shows a perspective view of an example tabletop remote control device.

FIG. 2A is an enlarged perspective view of the tabletop remote control device 140. The tabletop remote control device 140 may be configured to be placed on a surface (e.g., an end table or night stand). The tabletop remote control device 140 may be powered by a direct-current (DC) power source (e.g., a battery or an external DC power supply plugged into an electrical outlet). The tabletop remote control device 140 may comprise a user interface. The user interface may include one or more preset buttons 142, an on button 144, an off button 145, a raise button 146, and/or a lower button 147. The tabletop remote control device 140 may be configured to transmit digital messages via the RF signals 106 in response to an actuation of any of the buttons 142-147.

The tabletop remote control device 140 may be associated with one or more of the load control devices of the load control system 100 (e.g., the dimmer switch 110, the plug-in load control device 120, and the motorized window treatment 130). For example, if the tabletop remote control device 140 is associated with the dimmer switch 110, the dimmer switch 110 may be configured to turn the light bulb 112 on and off in response to actuations of the on and off buttons 144, 145 of the tabletop remote control device, respectively. The dimmer switch 110 may be configured to increase or decrease the amount of power delivered to the light bulb 112 in response to actuations of the raise and lower buttons 146, 147 of the tabletop remote control device 140, respectively. The dimmer switch 110 may be configured to adjust the intensity of the light bulb 112 to a respective preset intensity in response to an actuation of the one of the preset buttons 142.

The buttons 142-147 may have indicia (e.g., text or icons on or adjacent to the buttons) to describe the function of the buttons. For example, the indicia may be engraved into the buttons or may be on a label affixed to the buttons. The buttons 142-147 may be backlit (e.g., by LEDs) to enable the indicia on the buttons to be seen in a dark environment. The backlit buttons may form a first illuminated portion of the tabletop remote control device 140.

The user interface of the tabletop remote control device 140 may further comprise a second illuminated portion, e.g., in the form of one or more visual indicators 148 (e.g., LEDs) for providing feedback to a user of the load control system 100. The visual indicators 148 may be located adjacent to the buttons or on the front surface of the buttons (e.g., on the preset buttons 142 as shown in FIG. 2). For example, the visual indicators 148 may be illuminated when the preset associated with the adjacent preset button 142 is selected.

Figure 2B:
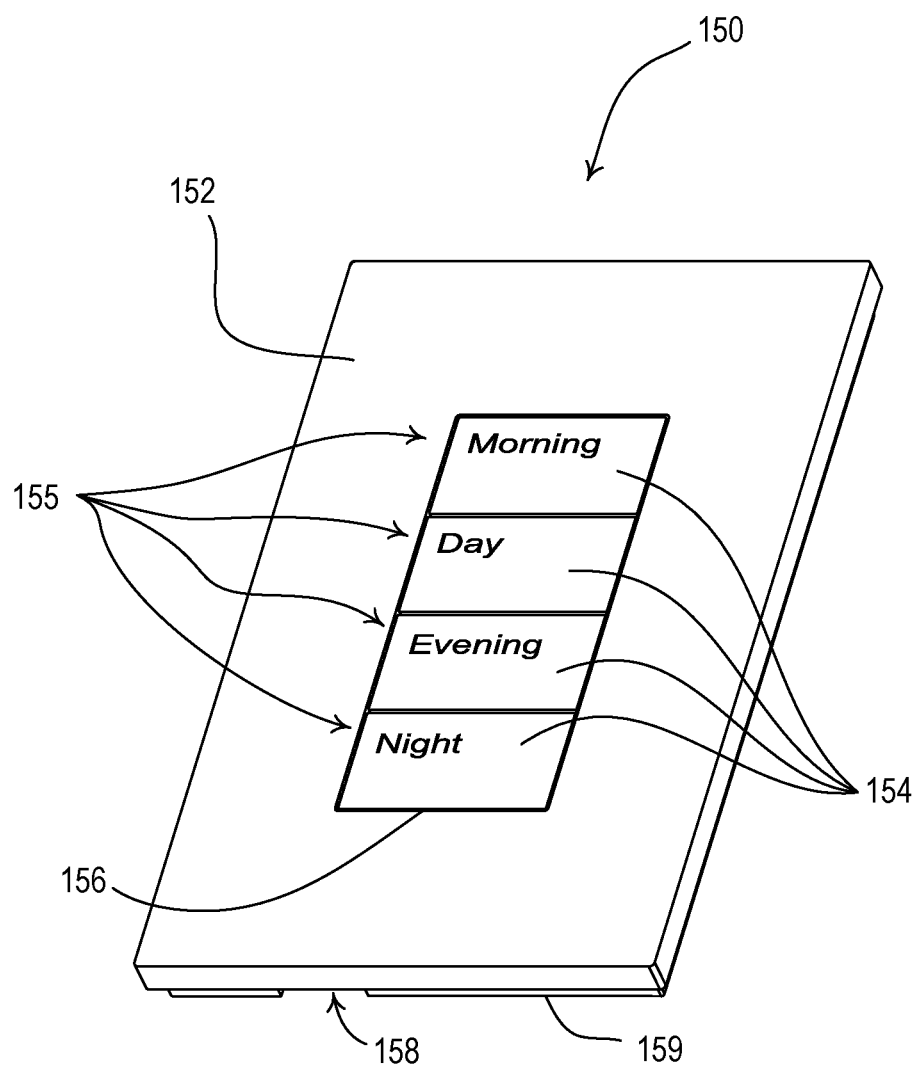
FIG. 2B shows a perspective view of an example wall-mounted remote control device.

FIG. 2B is an enlarged perspective view of the wall-mounted remote control device 150. The wall-mounted remote control device 150 may comprise a faceplate 152 and a plurality of buttons 154. The faceplate 152 may be mounted to an adapter 159 and the plurality of buttons 154 may be received through an opening 156 of the faceplate 152. The wall-mounted remote control device 150 may be electrically connected to an alternating-current (AC) power source (not shown) for receiving power, and be configured to transmit a digital message to one or more external load control devices for controlling their respective electrical loads. The digital message may be transmitted via a wired or wireless communication link, such as a radio-frequency (RF) communication link. Alternatively and/or additionally, the wall-mounted remote control device 150 may include an internal load control circuit for controlling at least the power delivered to one or more electrical loads.

The buttons 154 may include indicia, such as text 155, for indicating a preset (e.g., a lighting scene) or command that may be transmitted in response to an actuation of the button 154. Alternatively or additionally, the indicia on the buttons 154 may comprise an icon or symbol. A preset may relate to a particular mode of operation of an electrical load. For example, if the electrical load is a lighting load, the preset may relate to a particular lighting intensity level of the lighting load. For instance, a "morning" preset may set a lighting load at a medium-high lighting intensity level (e.g., 70% intensity), a "day" preset may set a lighting load at a high lighting intensity level (e.g., 100% intensity, or full on), an "evening" preset may set the lighting load at a medium-low intensity level (e.g., 30% intensity), and a "night" preset may set the lighting load at a low lighting intensity level (e.g., 10% intensity). The one or more presets or commands may be preconfigured and/or adjusted by the user through a commissioning mode of the wall-mounted remote control device 150.

The buttons 154 may be backlit to allow the indicia to be read in a wide range of ambient light levels. Each button 154 may be made of a translucent (e.g., transparent, clear, and/or diffusive) material and may be illuminated by one or more light sources (e.g., LEDs) located behind and/or to the side of the button (e.g., inside of the wall-mounted remote control device 150). The buttons 154 may each have a metallic surface, e.g., a metallic sheet (not shown), adhered to a front surface of the body. The text 155 may be etched into the metallic surface of each button 154. The illumination from the LEDs may shine through the translucent body, but not through the metallic surface, such that the text 155 of each button (e.g., that is etched away from the metallic surface) is illuminated. Alternatively or additionally, the buttons 154 may be coated with another type of opaque material, such as paint, and the text 155 may be etched into the paint. For example, the body of each button 154 may be made of a translucent material, such as glass. The opaque material (e.g., such as paint) may be coated onto the rear surface of the body and the text may be etched into paint on the rear surface of the body. Moreover, the faceplate 152 of the wall-mounted remote control device 150 may comprise a metallic sheet. Text or other indicia may be etched into the metallic faceplate and be backlit by LEDs located behind the faceplate.

The ambient light level in the room in which the wall-mounted remote control device 150 is installed may affect a user's ability to read the text 155 on the buttons 154. For example, if the contrast between the brightness of the illuminated text 155 and the brightness of the adjacent surface of the button 154 is too low, the illuminated text may appear washed out to the user. Other factors such as the color of the buttons, the color of the walls, ceilings, and floors in the room, and the like may also affect the readability of the text 155. As such, the user may not be able to identify which of the presets is selected (e.g., "active") based on the intensity of the illumination of the text 155. Accordingly, the wall-mounted remote control device 150 may comprise an integral ambient light sensor (e.g., an ambient light detection circuit), which may be located inside of the wall-mounted remote control device and may be configured to measure the ambient light level in the room in which the wall-mounted remote control device 150 is installed. For example, the wall-mounted remote control device 150 may comprise an opening 158 in the adapter 159 through which the ambient light detection circuit may receive light to make a determination of the ambient light level in the room. Alternatively or additionally, the wall-mounted remote control device 150 may comprise an opening in the faceplate 152 and/or one or more of the buttons 154 for allowing the ambient light detection circuit to receive light. In addition, the ambient light detection circuit may be configured to receive light through the gaps between the buttons 154 and/or through the material of the buttons. The ambient light detection circuit may also be positioned behind a semi-transparent or dark window and may be configured to receive light through the window. The wall-mounted remote control device 150 may comprise a light pipe for directing light from outside of the remote control device to the ambient light detection circuit.

The wall-mounted remote control device 150 may be configured to adjust its surface illumination intensities in response to the measured ambient light level. For example, the wall-mounted remote control device 150 may be configured to increase the surface illumination intensities if the ambient light level increases, and decrease the surface illumination intensities if the ambient light level decreases. Examples of wall-mounted remote control devices having an illuminated portion are described in greater detail in commonly-assigned U.S. patent application Ser. No. 14/850,315, filed Sep. 10, 2015, entitled CONTROL DEVICE HAVING BUTTONS WITH MULTIPLE-LEVEL BACKLIGHTING, the entire disclosure of which is hereby incorporated by reference.

Referring back to FIG. 1, the wall-mounted remote control device 150 may be associated with one or more of the load control devices of the load control system 100 and may be configured to transmit one or more digital messages (e.g., via the RF signals 106) to the associated load control devices in response to an actuation of any of the buttons 154. For example, the dimmer switch 110 may be configured to adjust the intensity of the light bulb 112 to a preset intensity in response to an actuation of the one of the buttons 154.

In addition to or in lieu of the wall-mounted remote control device 150, the load control system 100 may include a wall-mounted remote control device that may comprise a thin touch sensitive actuator as shown and described in previously-referenced U.S. Pat. No. 7,791,595. The thin touch sensitive actuator may be part of a user interface of the wall-mounted remoted control device. The wall-mounted remote control device may transmit digital messages for controlling one or more electrical loads in response to actuations of the thin touch sensitive actuator. The wall-mounted remote control device may illuminate the touch sensitive actuator (e.g., an illuminated portion) to provide feedback of the status of the electrical loads.

The visual display remote control device 160 may be configured to be mounted to a flat surface. For example, the visual display remote control device 160 may be mounted to a wall (e.g., to an electrical wallbox or surface-mounted to the wall). The visual display remote control device 160 may comprise a user interface having a touch-responsive visual display 162. The visual display 162 may be illuminated by a backlight, such that the visual display forms an illuminated portion of the visual display remote control device 160. The visual display remote control device 160 may comprise a touch sensitive element (e.g., a capacitive touch pad). The touch sensitive element may be displaced overtop the visual display 162 to allow the visual display remote control device to display "soft" buttons that may be actuated by a user. For example, the visual display remote control device 160 may be configured to provide a plurality of different "soft" buttons on the visual display 162 (e.g., via the touch sensitive element) to the user so that the user may monitor and/or adjust different operating characteristics of the load control system 100 using one or more of the "soft" buttons. In addition to or in lieu of the "soft" buttons, the visual display remote control device 160 may comprise "hard" buttons 164 (e.g., physical buttons), which may be used to select predetermined presets or scenes or turn predetermined loads on and off, for example.

The battery-powered remote control device 170 may comprise one or more actuators 172 (e.g., one or more of an on button, an off button, a raise button, a lower button, and a preset button). The battery-powered remote control device 170 may transmit RF signals 106 in response to actuations of one or more of the actuators 172. The battery-powered remote control device 170 may be operated in different ways, including, for example, being handheld, mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

The occupancy sensor 180 may be configured to detect occupancy and vacancy conditions in the space in which one or more of the control devices of the load control system 100 are installed. The occupancy sensor 180 may be installed in any particular way. For example, the occupancy sensor 180 may be configured to be mounted to a ceiling or a wall in the space in which one or more of the control devices of the load control system 100 are installed. The occupancy sensor 180 may transmit digital messages to one or more load control devices (e.g., the wall-mounted dimmer switch 110 and/or the plug-in load control device 120) in response to detecting the occupancy or vacancy conditions. The digital messages may be carried by wired or wireless signals (e.g., via the RF signals 106). The load control devices may be configured to operate the respective electrical loads (e.g., the light bulb 112, 122) in response to receiving the digital messages from the occupancy sensor 180. For example, the load control devices may be configured to turn on the respective electrical loads in response to receiving an occupied message, and to turn off the respective electrical loads in response to receiving a vacant message. The occupancy sensor 180 may operate as a vacancy sensor. For example, the sensor may be configured to turn off (e.g., only turn off) the lighting loads in response to detecting a vacancy condition (e.g., to not turn on the light bulbs 112, 122 in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 182 may be configured to measure a light intensity (e.g., a total light intensity) in the space in which one or more of the control devices of the load control system 100 is installed. The daylight sensor 182 may be installed in any particular way. For example, the daylight sensor 182 may be configured to be mounted to a ceiling or a wall in the space in which one or more of the control devices of the load control system 100 are installed. The daylight sensor 182 may transmit digital messages indicating the measured light intensity to one or more load control devices (e.g., the wall-mounted dimmer switch 110 and/or the plug-in load control device 120). The digital messages may be transmitted via wired or wireless signals (e.g., via the RF signals 106). The load control devices may control the operation of the respective electrical loads (e.g., the intensities of the light bulbs 112, 122) in response to the digital messages received (e.g., in response to the measured light intensity). For example, where the electrical loads are lighting loads, the load control devices may be configured to dim or turn off the respective lighting loads when sufficient daylight is detected by the day light sensor 182. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control devices (e.g., the dimmer switch 110, the plug-in load control device 120, and the motorized window treatment 130) and/or the input devices (e.g., the tabletop remote control 140, the wall-mounted remote control device 150, and the visual display remote control device 160) may be generally referred to herein as control devices. One or more of these control devices may comprise an illuminated portion and may be configured to illuminate the respective illuminated portions, for example, to help a user find and operate the control devices. However, the LEDs used to illuminate the illuminated portions may unnecessarily consume power, e.g., when the user is not operating the control devices, when the user is not in the vicinity of the control devices, and/or when the daylight level is appropriate to operate the control devices without the illuminated portion being illuminated. Therefore, the control devices of the load control system 100 may be configured to control their respective illuminated portions based on a condition of the space in which the control devices are installed. The condition may be sensed by a sensor (e.g., the occupancy sensor 180 and/or the daylight sensor 182) and indicated to the control devices (e.g., via digital messages transmitted by the sensor) in order to promote energy savings and/or convenience. For example, the dimmer switch 110 may adjust the intensities of the visual indicators 118 in response to the occupancy sensor 180 and/or the daylight sensor 182. The tabletop remote control device 140 may adjust the intensities of the LEDs backlighting the buttons 142-147 and/or the intensities of the LEDs illuminating the visual indicators 148 in response to the occupancy sensor 180 and/or the daylight sensor 182. The wall-mounted remote control device 150 may adjust the intensities of the LEDs backlighting the buttons 154 in response to the occupancy sensor 180 and/or the daylight sensor 182. The visual display remote control device 160 may turn the visual display 162 and/or the backlight for the visual display on and off in response to the occupancy sensor 180 and/or the daylight sensor 182.

In an example implementation, the control devices may be configured to turn their respective illuminated portions on and off in response to digital messages received from the occupancy sensor 180. For example, the control devices may be configured to illuminate the respective illuminated portions in response to receiving an "occupied" message from the occupancy sensor 180 when a user walks into the space in which the respective control devices are located. The control devices may be configured to cease illuminating their illuminated portions in response to receiving a "vacant" message from the occupancy sensor when the user leaves the space. For example, the control devices may be configured to start a timeout timer when the control devices first receive the "occupied" message and then to turn off the illumination of the illuminated portions when the timeout timer expires.

One or more occupancy sensors may be included in the load control system 100. For example, a single occupancy sensor (e.g., the occupancy sensor 180) may be used to control the illuminated portions of a plurality of control devices in response to the occupancy and/or vacancy conditions sensed by the occupancy sensor. This way, the control devices may not all require individual sensors, and may thus be more compact, less complex, and/or cheaper. The total cost of the load control system 100 may be reduced accordingly. Further, since the control devices may all be responsive to the single occupancy sensor, the illuminated portions of the control devices may be controlled in unison (e.g., controlled on and off together) in response to the occupancy and vacancy conditions sensed by the occupancy sensor.

The single occupancy sensor described herein may be a sensor that is external to all of the control devices, as shown, for example, by the occupancy sensor 180 in FIG. 1. The single occupancy sensor may also be an integral sensor included in one of the control devices of the load control system 100 (e.g., an internal occupancy sensing circuit). This control device may be configured to transmit digital messages including the occupancy and vacancy conditions detected by its integral occupancy sensor to the other control devices in the load control system 100. The receiving control devices may control their respective illuminated portions in response to receiving the occupancy and vacancy conditions. If one of the control devices has an integral occupancy sensor, the occupancy sensor 180 may not be required in the load control system 100 in order to control the illuminated portions of a plurality of control devices in response to occupancy and vacancy conditions.

The control devices may be configured to turn their respective illuminated portions on and off in response to digital messages received from the daylight sensor 182. For example, the control devices may be configured to turn off the illumination of their respective illuminated portions if the control devices determine that the light level indicated in the digital messages (e.g., received from the daylight sensor 182) is sufficient for a user to read the text or indicia on the control device. In an example implementation, the control devices may determine that the light level is sufficient if the light level is above a threshold light level (e.g., during the daytime). The control devices may be configured to illuminate their respective illuminated portions if the light level is below the threshold light level (e.g., during the nighttime).

The control devices may be configured to adjust the intensity of the illuminated portions in response to the light level received in the digital messages from the daylight sensor 182. For example, the control devices may be configured to operate in a continuous mode and adjust the intensity level of the LEDs illuminating the illuminated portions in response to the light level received (e.g., as a function of the light level). In an example implementation, the control devices may be configured to control the intensity level of the LEDs to be proportional to the light level received so that the backlight intensity of the visual display 162 of the visual display remote control device 160 may be increased as the ambient light intensity in the space increases. In another example implementation, the control devices may be configured to control the intensity level of the LEDs to be inversely proportional to the light level sensed by the daylight sensor 182.

One or more daylight sensors may be included in the load control system 100. For example, a single daylight sensor (e.g., the daylight sensor 182) may be used to control the illuminated portions of a plurality of control devices in response to the ambient light level sensed by the single daylight sensor. Such an implementation may reduce the size and complexity of the individual control devices and/or the total cost of the load control system 100, since the control devices may not all require individual sensors for detecting the light level. Further, since the control devices may all be responsive to the single daylight sensor, the illuminated portions of the control devices may be controlled in unison (e.g., adjusted to the same intensity) in response to the single measured ambient light level.

The single daylight sensor described herein may be a sensor that is external to all of the control devices, as shown, for example, by the daylight sensor 182 in FIG. 1. The single daylight sensor may also be an integral sensor included in one of the control devices of the load control system 100 (e.g., an internal daylight sensing circuit). This control device may be configured to transmit digital messages including the ambient light level sensed by its integral sensor to the other control devices in the load the control system 100. The receiving control devices may control their respective illuminated portions in response to the ambient light level received. If one of the control devices has an integral daylight sensor, the daylight sensor 182 may not be required in the load control system 100 in order to control the illuminated portions of a plurality of control devices in response to the ambient light level.

More than one control device in the load control system 100 may include an integral sensor. For example, multiple control devices in the load control system 100 may include an integral daylight sensor and may each be configured to communicate their respective measured ambient light levels to the other control devices in the load control system 100, e.g., using wired (e.g., via separate communication wiring) or wireless (e.g., via RF or infrared signals) communication mechanism. For example, a control device with an integral daylight sensor may communicate its measured ambient light level to other control devices that may or may not include an integral daylight sensor. The control devices receiving the communication may be configured to process the ambient light level communicated to them and control their respective illuminated portions in response to the ambient light level. If a control device receives communications from multiple other control devices regarding a measured ambient light level, the control device may be configured to aggregate the communications and determine a representative ambient light level based on a result of the aggregation. If the receiving control device itself also includes an integral sensor, it may further aggregate the ambient light level measured by its own sensor with the representative ambient light level measured by the multiple other control devices. For example, the control device may be configured to calculate an average ambient light level based on the ambient light levels received from the other control devices as well as the ambient light level sensed by the control device's own integral daylight sensor (if any). The control device may be further configured to control its illuminated portion in response to the average ambient light level.

FIG. 3 shows an example multi-gang configuration 190 in which three control devices 192A, 192B, 192C are installed side-by-side, e.g., in a multi-gang electrical wallbox. The multi-gang configuration 190 may comprise a multi-gang faceplate 194, which may be mounted to an adapter 195 and may have multiple openings 196A, 196B, 196C. The control devices 192A, 192B, 192C may each comprise respective buttons 198a, 198b, 198c that are received through the respective openings 196A, 196B, 196C of the multi-gang faceplate 194. Even though the control devices 192A, 192B, 192C are shown in the figure as wall-mounted remote control devices (e.g., such the wall-mounted remote control device 150), the control devices may be of any particular type as described herein.

The control devices 192A, 192B, 192C may each include an illuminated portion (e.g., the buttons 198a, 198b, 198c). One or more of the control devices 192A, 192B, 192C may each include an integral daylight detection circuit. For example, all three of the control devices may include an integral ambient light detection circuit (not shown), and may be configured to communicate ambient light levels sensed by the respective ambient light detection circuits to the other control devices (e.g., using wired or wireless communication). As shown in FIG. 3, the adapter 195 may comprise multiple openings 199A, 199B, 199C through which the respective ambient light detection circuits may receive light to make a determination of the ambient light level in the room. For example, the control device 192A may transmit a signal indicative of the ambient light level sensed by its ambient light detection circuit to the control devices 192B and 192C. Likewise, the control devices 192B and 192C may each transmit a signal (e.g., a control signal) indicative of the ambient light level sensed by their respective ambient light detection circuits and to the other two control devices in the multi-gang configuration 190.

The control devices 192A, 192B, 192C may each be configured to aggregate the information they receive (e.g., via the control signals described herein) regarding the ambient light level in the installation environment, and to control their respective illuminated portions accordingly. For example, the control devices 192A, 192B, 192C in the multi-gang configuration 190 may form a group and may be configured to control their respective illuminated portions based on an average ambient light level. The average ambient light level may be calculated based on ambient light levels sensed by a plurality of control devices in the group. The averaging may be conducted using any type of averaging algorithms, including, for example, an arithmetic mean, a weighted average, and/or the like. The control devices 192A, 192B, 192C may be configured to adjust the intensity of their respective illuminated portions based on a result of the aggregation (e.g., based on the average ambient light level). This way, the illuminated portions of the three control devices 192A, 192B, 192C may be illuminated in unison based on one light level (e.g., the average light level). Aesthetic appeal of the multi-gang configuration may increase because of uniform illumination of the three control devices. Fault tolerance capability may also be improved because even if the integral ambient light detection circuit of one of the control devices 192A, 192B, 192C enters an erroneous state, that control device may still be able to adjust its illuminated portion based on measurements provided by the other two control devices.

The control devices 192A, 192B, 192C may be configured to adjust the intensity of their respective illuminated portions based on the ambient light level sensed by the ambient light detection circuit of a selected one of the control devices. For instance, as shown in FIG. 3, the control devices 192A, 192B, 192C in the multi-gang configuration 190 may form a group and one of the three control devices may be selected as a designated control device whose ambient light detection circuit may be used by the group. The selection of the designated control device may be made automatically (e.g., via pre-configuration) or via a graphical user interface (GUI). For example, the respective ambient light detection circuits on the control devices 192A, 192B, 192C may be offset from the center of the respective control devices such that the ambient light detection circuit on one of the control devices may be closer to the other control devices. The control devices 192A, 192B, 192C may be configured (e.g., preconfigured) to determine which one of them has an ambient light detection circuit with an offset closest to the other control devices and to set that control device as the device whose ambient light detected will be used for the group. Once it is determined which control device will use its ambient light level for the group, that control device may communicate its measured ambient light level to one or more other control devices in the group using wired (e.g., via separate communication wiring) or wireless communication (e.g., via RF or infrared signals).

Even though three control devices 192A, 192B, 192C are shown in FIG. 3, any number of control devices may be installed close to each other (e.g., ganged together in a wallbox or located close to each other in the same room/ space). The specific installation configuration may be based on, for example, consumer demands and/or conditions of the installation environment. And even though in the depiction all three control devices 192A, 192B, 192C include an integral ambient light detection circuit, the features described herein are not limited to such a configuration. For example, two of the three control devices may include an integral ambient light detection circuit and the third control device may not include an integral ambient light detection circuit. The two control devices equipped with the ambient light detection circuits may transmit signals (e.g., a control signal) indicative of the ambient light level sensed by their respective ambient light detection circuits. The signals may be received by the other control devices in the system and be used by those control devices to adjust their respective illustrated portions (e.g., using an averaging algorithm as described herein). As another example, one of the three control devices may include an integral ambient light detection circuit and be designated to provide ambient light level for all three control devices. In some examples, there may be an external sensor (e.g., a sensor having an ambient light detection circuit external to all of the control devices) in addition to one or more integral ambient light detection circuits. The external sensor may be configured to transmit a signal indicative of the light level sensed, and the control devices may be configured to adjust their respective illustrated portions based on an aggregation of the light levels sensed by the external sensor as well as the integral ambient light detection circuits (e.g., using an averaging algorithm as described herein).

When one or more control devices in the load control system 100 include an integral daylight sensor (e.g., an integral ambient light detection circuit) and/or when there is an external sensor, a control device may be designated to receive the light levels measured and communicated by the other control devices. Based on the communications, the designated control device may derive a representative light level and transmit the representative light level to the other control devices in the load control system 100. For example, the designated control device may calculate an average light level based on the light levels received. The averaging may be conducted using any type of averaging algorithms, including, for example, an arithmetic mean, a weighted average, and/or the like. The representative light level may also be derived using a different function or formula (e.g., a complex function). The control devices may be located in the same room/space and/or ganged together in an electrical wallbox.

The load control system 100 may comprise a sensor having both an occupancy sensing circuit and an ambient light sensing circuit. For example, the occupancy sensor 180 may be configured to measure both an occupancy condition and an ambient light level in the space and to transmit both the occupancy information and the ambient light level to the control devices of the load control system 100.

The load control system 100 may comprise other types of load control devices, such as, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a set-point temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise other types of input devices and/or sensors, such as, for example, temperature sensors, humidity sensors, radiometers, cloudy-day sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices, power monitoring devices (such as power meters, energy meters, utility submeters, utility rate meters), central control transmitters, residential, commercial, or industrial controllers, or any combination of these devices.

The load control system 100 may comprise a system controller configured to receive digital messages from one or more sensors (e.g., such as the occupancy sensor 180, the daylight sensor 182, and/or an integral sensor described herein). The digital messages may include information regarding a condition or parameter sensed by the sensors. The system controller may be configured to aggregate the information received from the sensors and transmit a control signal to one or more control devices in the load control system 100 based on the aggregation. For example, the system controller may be configured to calculate an average light level based on light levels measured and transmitted by multiple daylight sensors. The averaging may be performed using any type of averaging algorithms, including, for example, an arithmetic mean, a weighted average, and/or the like. Upon deriving the average light level, the system controller may transmit a control signal to one or more control devices in the load control system 100, e.g., to instruct the control devices to adjust their respective illuminated portions. The control devices may be configured to control the respective illuminated portions in response to the control signal received from the system controller.

Figure 4:
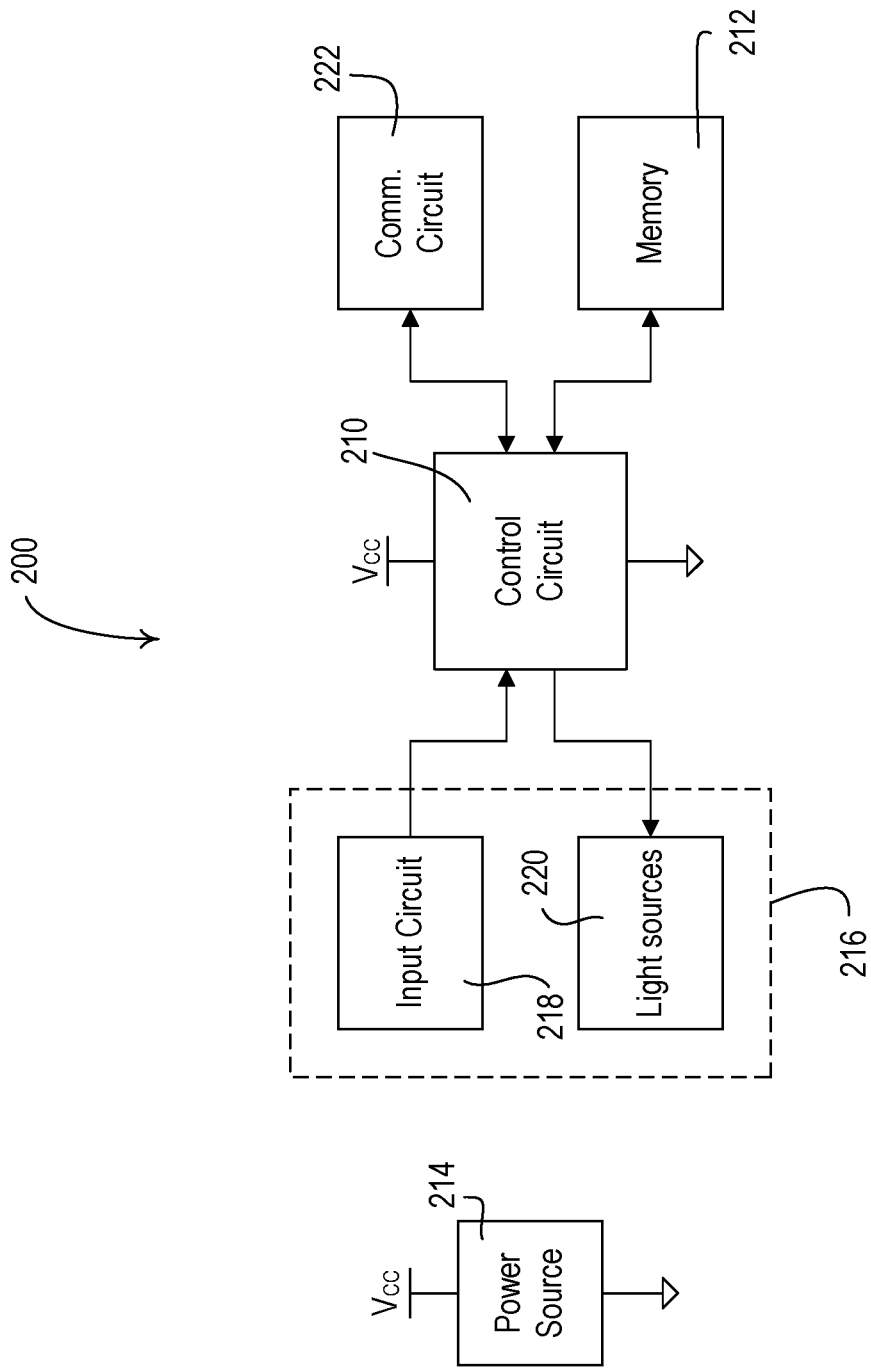
FIG. 4 shows a block diagram of an example control device.

FIG. 4 is a simplified block diagram of an example control device 200, which may be deployed, for example, as one of the input devices of the load control system 100 shown in FIG. 1 (e.g., the tabletop remote control device 140, the wall-mounted remote control device 150, the visual display remote control device 160, and/or the battery-powered handheld remote control device 170). The control device 200 may comprise a control circuit 210 configured to control at least one electrical load. The control circuit 210 may include one or more of a processor (e.g., a microprocessor), a microcontroller, a programmable logic device (PLD), a field programmable gate array (FPGA), an application specific integrated circuit (ASIC), or any suitable processing device. The control circuit 210 may be coupled to a memory 212, which may store operational characteristics of the control device 200 and/or the electrical load. The memory 212 may be implemented as an external integrated circuit (IC) or as an internal circuit of the control circuit 210. The control device 200 may comprise a power source 214 for generating a DC supply voltage $V_{CC}$ for powering the control circuit 210, the memory 212, and/or other circuitry of the control device. The power source 214 may comprise a battery and/or a power supply that receives power from an external alternating-current (AC) or direct-current (DC) power source.

The control device 200 may comprise a user interface 216 electrically coupled to the control circuit 210. The user interface 216 may have an input circuit 218 and/or one or more light sources 220 (e.g., LEDs). The light sources 220 may be used to illuminate one or more illuminated portions of the control device 200, which may also be electrically coupled to the control circuit 210. For example, the input circuit 218 may comprise one or more actuators (e.g., such as the buttons 142-147, 154) and/or a touch-responsive visual display (e.g., such as the touch-responsive visual display 162) for receiving a user input. The light sources 220 may be configured to illuminate the actuators and/or the visual display of the input circuit 218. The light sources 220 may also be configured to illuminate one or more visual indicators (such as the visual indicators 148) of the control device 200.

The control device 200 may further comprise a communication circuit 222, e.g., a wireless communication circuit. The communication circuit 222 may include, for example, an RF transceiver, transmitter, and/or receiver coupled to an antenna for transmitting and/or receiving RF signals (e.g., the RF signals 106 shown in FIG. 1). The control circuit 210 may be electrically coupled to the communication circuit 222 for transmitting digital messages to control one or more load control devices (e.g., the dimmer switch 110, the plug-in load control device 120, and/or the motorized window treatment 130). For example, a user input may be received via the user interface 216 via the raise or lower buttons 146, 147. In response to receiving the user input, the control circuit 210 may transmit digital messages (e.g., via the RF signals 106) to the dimmer switch 110 instructing it to increase or decrease the amount of power delivered to the light bulb 112. The control circuit 210 may be configured to receive digital messages from one or more load control devices (e.g., the dimmer switch 110, the plug-in load control device 120, and/or the motorized window treatment 130). For example, the control circuit 210 may be configured to display a status of the electrical loads and/or the load control devices of the load control system 100 on the visual indicators of the control device 200 in response to receiving the digital messages from the one or more load control devices. As another example, the control circuit 210 may be configured to display an amount of power presently being delivered to one or more electrical loads on the visual display 162 in response to receiving the digital messages.

The control circuit 210 may be configured to receive a control signal from one or more sensors, e.g., the occupancy sensor 180 and/or the daylight sensor 182. Such control signal may be the same control signal transmitted by the sensors for controlling one or more electrical loads or may be a different control signal (e.g., a new control signal for controlling the illuminated portions of the control device 200). The control signal may be received in the form of digital messages. The control circuit 210 may be configured to control the light sources 220 (and thus the illuminated portions) in response to receiving the control signal from the sensors. As an example, the control circuit 210 may be configured to turn on the light sources 220 in response to receiving an "occupied" message from the occupancy sensor 180, and to turn off the light sources 220 in response to receiving a "vacant" message from the occupancy sensor. As another example, the control circuit 210 may adjust the intensity of the light sources 220 to a dim level in response to a "vacant" message (e.g., rather than turning the light sources off). As yet another example, the control circuit 210 may be configured to start a timeout timer when the control circuit first receives the "occupied" message and then to turn off or dim the light sources 220 when the timeout timer expires.

The control circuit 210 may be configured to compare a measured light level (e.g., included in a digital message from the daylight sensor) to a threshold light level. The threshold light level may be pre-configured and/or stored in memory. The threshold light level may be adjusted after the initial configuration. For example, the control circuit 210 may be configured to turn off the light sources 220 if the measured light level is equal to or above the threshold light level and to turn on the light sources if the measured light level is below the threshold light level. The control circuit 210 may be configured to adjust the intensity level of the light sources 220 in response to the measured light level received from the daylight sensor 182. For example, the control circuit 210 may be configured to increase the intensity of the light sources 220 as the measured light level increases and/or decrease the intensity of the light sources as the measured light level decreases.

Figure 5:
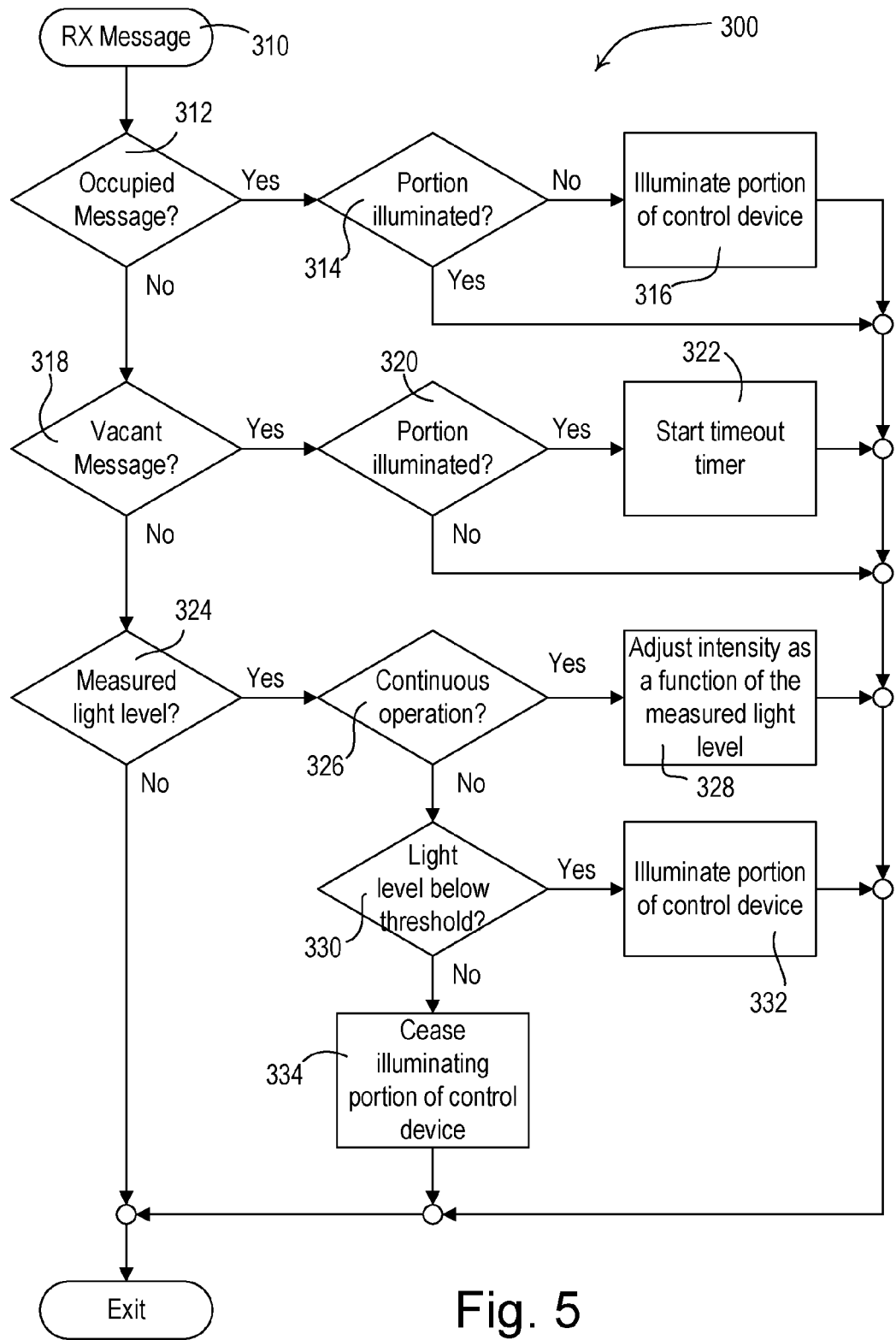
FIG. 5 shows an example procedure for illuminating an illuminated portion of a control device in response to an external sensor.

FIG. 5 illustrates an example procedure 300 for illuminating an illuminated portion of a control device such as visual indicators (such as the visual indicators 118, 148), backlit actuators (such as the buttons 142-147, 154), and/or visual displays (such as the visual display 162). The illumination procedure 300 may be executed by a control circuit (e.g., the control circuit 210 of the control device 200 shown in FIG. 4 and/or a control circuit of the input devices shown in FIG. 1) in response to receiving a digital message from a sensor (e.g., the occupancy sensor 180 and/or the daylight sensor 182) at step 310. If the received digital message is an "occupied" message from the occupancy sensor 182 at step 312 and the illuminated portion is presently being illuminated at step 314, the illumination procedure 300 may simply exit. However, if the illuminated portion is presently not being illuminated at step 314, the control circuit may illuminate the illuminated portion at step 316 (e.g., by illuminating the light sources 220). If the received digital message is a "vacant" message from the occupancy sensor 182 at step 318 and the illuminated portion is presently not being illuminated at step 320, the control circuit may start a timeout timer at step 322 before the illumination procedure 300 exits. When the timeout timer expires, the control circuit may cease the illumination of the illuminated portion at step 316 (e.g., by turning off the light sources 220).

If the received digital message includes a measured light level at step 324 and the control circuit is configured to provide continuous operation of the illuminated portion at step 326, the control device may adjust the intensity of the illuminated portion as a function of the measured light level at step 328 (e.g., proportional to the measured light level), before the illumination procedure exits. If the control circuit is configured to turn the illuminated portion on and off (e.g., rather that providing continuous operation) at step 326, and the measured light level is below the threshold level at step 330, the control circuit may illuminate the illuminated portion of the control device at step 322 and the illumination procedure 300 may exit. If the measured light level is not below the threshold level at step 330, the control circuit may cease the illumination of the illuminated portion of the control device at step 324 and the illumination procedure 300 may exit.

What is claimed is:

1. A system for controlling one or more electrical loads, the system comprising:
   a plurality of control devices installed in a multi-gang configuration, each of the plurality of control devices configured to receive a user input and control at least one of the electrical loads, the control devices each comprising a user interface and a light source internal to a housing of the control device, the light source configured to illuminate the user interface to provide feedback to a user of the control device; and
   a first sensor internal to and within the housing of one of the plurality of control devices and external to and outside of the housing of at least another one of the plurality of control devices, the first sensor configured to sense a condition of a space in which the plurality of control devices are installed, wherein all of the plurality of the control devices are configured to control their respective light sources in response to the condition sensed by the first sensor.

2. The system of claim 1, wherein all of the plurality of control devices are each configured to receive a signal indicative of the condition sensed by the first sensor.

3. The system of claim 2, further comprising:
a second control device of the plurality of control devices comprises a second sensor configured to sense the condition of the space in which the plurality of control devices are installed, wherein the second sensor is internal to and within the housing of the second control device external to and outside of the housing of at least another one of the plurality of control devices;
wherein a first control device of the plurality of control devices comprises the first sensor; and
wherein all of the plurality of control devices are each configured to receive a signal indicative of the condition sensed by the second sensor, and configured to control their respective light sources in response to the condition sensed by the first sensor and the condition sensed by the second sensor.

4. The system of claim 3, wherein the plurality of control devices are configured to control their respective light sources based on an aggregation of the condition sensed by the first sensor and the condition sensed by the second sensor.

5. The system of claim 4, wherein the condition sensed by the first sensor and the second sensor is a light level in the space in which the plurality of control devices are installed.

6. The system of claim 4, wherein the aggregation of the condition sensed by the first sensor and the condition sensed by the second sensor is based on an averaging algorithm.

7. The system of claim 1, further comprising:
a load control circuit configured to control at least one of the electrical loads in response to the condition sensed by the first sensor.

8. The system of claim 1, wherein the first sensor is configured to measure a light level in the space in which the plurality of control devices are installed, and the plurality of control devices are configured to adjust an intensity of their respective light sources in response to the light level measured by the first sensor.

9. The system of claim 8, wherein the plurality of control devices are configured to adjust the intensity of their respective light sources in response to the measured light level by increasing the intensity of the respective light source in response to the measured light level increasing, and decreasing the intensity of the respective light source in response to the measured light level decreasing.

10. The system of claim 1, wherein the first sensor is configured to detect an occupancy or a vacancy condition in the space in which the plurality of control devices are installed, the plurality of control devices configured to turn on their respective light sources based on the first sensor detecting the occupancy condition in the space, and to turn off their respective light sources based on the first sensor detecting the vacancy condition in the space.

11. The system of claim 1, wherein the light source of one of the plurality of control devices is configured to illuminate a visual display that is configured to display feedback to the user, the one of the plurality of control devices configured to turn the visual display on and off in response to the condition sensed by the first sensor.

12. The system of claim 1, wherein the light source of one of the plurality of control devices is configured to illuminate an actuator that is configured to be actuated by the user to receive the user input.

13. The system of claim 1, further comprising:
a system controller configured to transmit a control signal to the plurality of control devices in response to the first sensor;
wherein the plurality of control devices are configured to control their respective light sources in response to the control signal received from the system controller.

14. The system of claim 1, wherein the feedback comprises an indication of whether a button of the user interface is in an active state.

15. A system for controlling at least one electrical load, the system comprising:
a first control device comprising a first user interface configured to receive a user input and a first light source internal to a housing of the first control device, the first light source configured to illuminate the first user interface to provide feedback to a user of the first control device; and
a second control device installed in a multi-gang configuration with the first control device comprising a control circuit, a second user interface configured to receive a user input, a second light source internal to a housing of the second control device, and a sensor configured to sense a condition of a space in which the first and the second control devices are installed, wherein the second light source is configured to illuminate the second user interface to provide feedback to the user of the second control device, and wherein the control circuit is configured to:
receive a signal from the sensor indicating a condition of the space in which the first and the second control devices are installed,
control the second light source in response to receiving the signal from the sensor, and
transmit a signal indicative of the condition of the space sensed by the sensor to the first control device;
wherein the first control device is configured to control the first light source in response to receiving the signal indicative of the condition of the space sensed by the sensor of the second control device.

16. The system of claim 15, wherein the first control device is configured to control the at least one electrical load in response to the first user interface receiving the user input.

17. The system of claim 16, wherein the first control device is further configured to control a first electrical load in response to receiving the signal indicative of the condition of the space sensed by the sensor.

18. The system of claim 17,
wherein the signal from the sensor is indicative of a measured light level in the space in which the first and the second control devices are installed, and
wherein the first and the second control devices are configured to adjust an intensity of the first and the second light sources, respectively, in response to the measured light level.

19. The system of claim 17,
wherein the signal from the sensor is indicative of an occupancy or a vacancy condition in the space in which the first and the second control devices are installed, and
wherein the first and the second control devices are configured to turn on the first and the second light sources, respectively, based on the signal from the sensor indicating the occupancy condition in the space, and to turn off the first and the second light sources, respectively, based on the signal from the sensor indicating the vacancy condition in the space.

20. The system of claim 18, wherein the control circuit is configured to adjust the intensity of the second light source in response to the measured light level by increasing the intensity of the second light source in response to the measured light level increasing, and decreasing the intensity of the second light source in response to the measured light level decreasing.

21. The system of claim 15, wherein the first and the second light sources are configured to illuminate a first and a second visual displays, respectively, which are configured to display feedback to the user.

22. The system of claim 15, wherein the first and the second light sources are configured to illuminate a first button and a second button, respectively, which are configured to be actuated by the user to receive the user input.

23. The system of claim 15, wherein the feedback comprises an indication of whether a button of the user interface is in an active state.

24. The system of claim 15, wherein the first control device further comprises a control circuit and a sensor, the sensor configured to sense the condition of the space in which the first and the second control devices are installed, wherein the control circuit associated with the second control device is configured to:
receive a signal indicative of the condition of the space sensed by the sensor of the first control device; and
control the second light source in response to receiving the signals indicative of the condition of the space sensed by the sensors of the first and the second control devices.

25. The system of claim 24, wherein the control circuit of the second control device is configured to control the second light source based on an aggregation of the signals indicative of the condition of the space sensed by the sensor of the first and the second control devices.

26. The system of claim 25, wherein the aggregation of the signals indicative of the condition of the space sensed by the sensors of the first and the second control devices are based on an averaging algorithm.

27. The system of claim 15, wherein the first control device further comprises a control circuit and a sensor, the sensor of the first control device configured to sense the condition of the space in which the first and the second control devices are installed, wherein the control circuit of the first control device is configured to:
receive the signal indicative of the condition of the space sensed by the sensor of the second control device;
receive a signal indicative of the condition of the space sensed by the sensor of the first control device;
ignore the signal indicative of the condition of the space sensed by the sensor of the first control device; and
control the first light source based on the signal indicative of the condition of the space sensed by the sensor of the second control device.

28. A load control system for controlling an electrical load, the load control system comprising:
a first load control device;
an input device assigned to the first load control device, the input device comprising a user interface and a light source internal to a housing of the input device, the light source configured to illuminate the user interface to provide feedback to a user of the input device, the input device configured to:
receive a user input via the user interface, and
based on the user input, transmit a first control signal for controlling the electrical load; and
a sensor configured to:
sense a condition of a space in which the electrical load is installed, and in response to sensing the condition, transmit a second control signal for controlling the electrical load;
wherein the first load control device is configured to:
control the electrical load in response to the first control signal received from the input device, and
control the electrical load in response to the second control signal received from the sensor; and
wherein the sensor is external to and outside of both the input device and the first load control device, the input device configured to control the light source internal to the housing of the input device in response to the condition sensed by the sensor; and
a second load control device that comprises the sensor, the second load control device installed in the space in which the electrical load is installed,
wherein the first load control device and the second load control device are installed in a multi-gang configuration.

29. The load control system of claim 28, wherein the sensor is configured to measure a light level in the space in which the electrical load is installed, the input device configured to adjust an intensity of the light source internal to the housing in response to the light level measured by the sensor.

30. The load control system of claim 29, wherein the input device is configured to adjust the intensity of the light source in response to the measured light level by increasing the intensity of the light source in response to the measured light level increasing, and decreasing the intensity of the light source in response to the measured light level decreasing.

31. The load control system of claim 28, wherein the sensor is configured to detect an occupancy or a vacancy condition in the space in which the electrical load is installed, the input device configured to turn on the light source based on the sensor detecting the occupancy condition in the space, and to turn off the light source based on the sensor detecting the vacancy condition in the space.

32. The load control system of claim 28, wherein at least one light source is configured to illuminate a visual display that is configured to display feedback to the user.

33. The load control system of claim 28, wherein the light source internal to the housing of the input device is configured to illuminate a button that is configured to be actuated by the user to receive the user input.

34. The load control system of claim 28, wherein the sensor is configured to transmit a third control signal to the input device in response to sensing the condition, the input device configured to control the light source internal to the housing of the input device in response to the third control signal received from the sensor.

35. The load control system of claim 28, further comprising:
a system controller configured to transmit a third control signal to the input device in response to the sensor sensing the condition, the input device configured to control the light source internal to the housing of the input device in response to the third control signal received from the system controller.

36. The load control system of claim 28, wherein the feedback comprises an indication of whether a button of the user interface is in an active state.

\* \* \* \* \*